United States Patent
Alexander et al.

(10) Patent No.: US 7,039,768 B2
(45) Date of Patent: May 2, 2006

(54) CACHE PREDICTOR FOR SIMULTANEOUS MULTI-THREADED PROCESSOR SYSTEM SUPPORTING MULTIPLE TRANSACTIONS

(75) Inventors: Gregory William Alexander, Austin, TX (US); David Stephen Levitan, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/424,487

(22) Filed: Apr. 25, 2003

(65) Prior Publication Data

US 2004/0215882 A1    Oct. 28, 2004

(51) Int. Cl.
*G06F 12/00* (2006.01)
(52) U.S. Cl. .................. 711/146; 711/125; 711/204
(58) Field of Classification Search ............. 711/125, 711/146, 204
See application file for complete search history.

(56) References Cited

U.S. PATENT DOCUMENTS

| 5,918,044 | A | | 6/1999 | Levitan et al. |
| 6,161,166 | A | * | 12/2000 | Doing et al. ............... 711/125 |
| 6,263,404 | B1 | * | 7/2001 | Borkenhagen et al. ...... 711/137 |

* cited by examiner

*Primary Examiner*—Reba I. Elmore
(74) *Attorney, Agent, or Firm*—Casimer K. Salys; Dillon & Yudell LLP (57) ABSTRACT

A set-associative I-cache that enables early cache hit prediction and correct way selection when the processor is executing instructions of multiple threads having similar EAs. Each way of the I-cache comprises an EA Directory (EA Dir), which includes a series of thread valid bits that are individually assigned to one of the multiple threads. Particular ones of the thread valid bits are set in each EA Dir to indicate when an instruction block the thread is cached within the particular way with which the EA Dir is associated. When a cache line request for a particular thread is received, a cache hit is predicted when the EA of the request matches the EA in the EA Dir and the cache line is selected from the way associated with the EA Dir who has the thread valid bit for that thread set. Early way selection is thus achieved since the way selection only requires a check of the thread valid bits.

36 Claims, 4 Drawing Sheets

CACHE PREDICTOR FOR SIMULTANEOUS MULTI-THREADED PROCESSOR SYSTEM SUPPORTING MULTIPLE TRANSACTIONS

BACKGROUND OF THE INVENTION

1. Technical Field

The present invention relates to data processing and in particular to multi-threaded operations in cache memory of data processing systems. Still more particularly, the present invention relates to a method and system for predicting a way in set-associative caches in a multi-threaded processing environment.

2. Description of the Related Art

Processing systems employing cache memories are well known in the art. A cache is a hardware-managed buffer designed to reduce memory access latency by copying data from memory, which is likely to be accessed in the near future. Cache memory systems store the most frequently accessed instructions and data in the faster accessible cache memory to overcome the problems of long memory access latency when needed data/instructions have to be retrieved from the lower level memory. Thus, with the utilization of caches, the average memory access time of the overall processing system approaches the access time of the cache.

In the presence of an associated cache, a device that needs to access memory, such as a processor, first looks in the cache for a copy of data from the desired memory location. If a copy is found, the device uses the copy, thus avoiding the longer latency of accessing memory itself. Caches are used for both data and instructions, and a system may have multiple caches.

Typically, these caches include bifurcated level one (L1) instruction cache (I-cache) and L1 data cache (D-cache) and a larger L2 cache. Generally speaking, an I-cache is a high speed cache memory provided to temporarily store instructions prior to their dispatch to decode units of the processor. Processor execution involves first retrieving (or fetching) a set of instructions for processing by the execution units. These instructions are initially loaded from memory and stored within I-cache following an initial processor request for instructions from the memory address within the request.

An I-cache holds a fixed number of cache-line entries, each containing the cached instructions as well as enough information to identify the memory address associated with the instructions and some cache management state information. Because caches map directly to memory locations, cache addresses are typically physical (or real) addresses that mirror their corresponding physical memory addresses. The physical address information of the I-cache are stored within an associated I-directory.

A number of cache-to-memory mapping techniques are utilized, including: (i) fully associative, (ii) direct-mapped, and (iii) set-associative. These techniques differ in the group of the cache-line entries that can be used to store a cache-line with particular address bits in common. Set associative caching, for example, involves a multi-array configuration that comprises two or more directories and two or more associated data arrays (otherwise termed "banks", "compartments", or "ways"). Typically, the critical path, i.e., the path requiring the most time to complete, in a set associative cache, is through a directory to a compare circuit that selects the memory way/bank/set of the I-cache from which the requested instructions will be selected. The selection of data from one way over the other way(s) is completed via a MUX select and is referred to as a late select.

Figure 1:
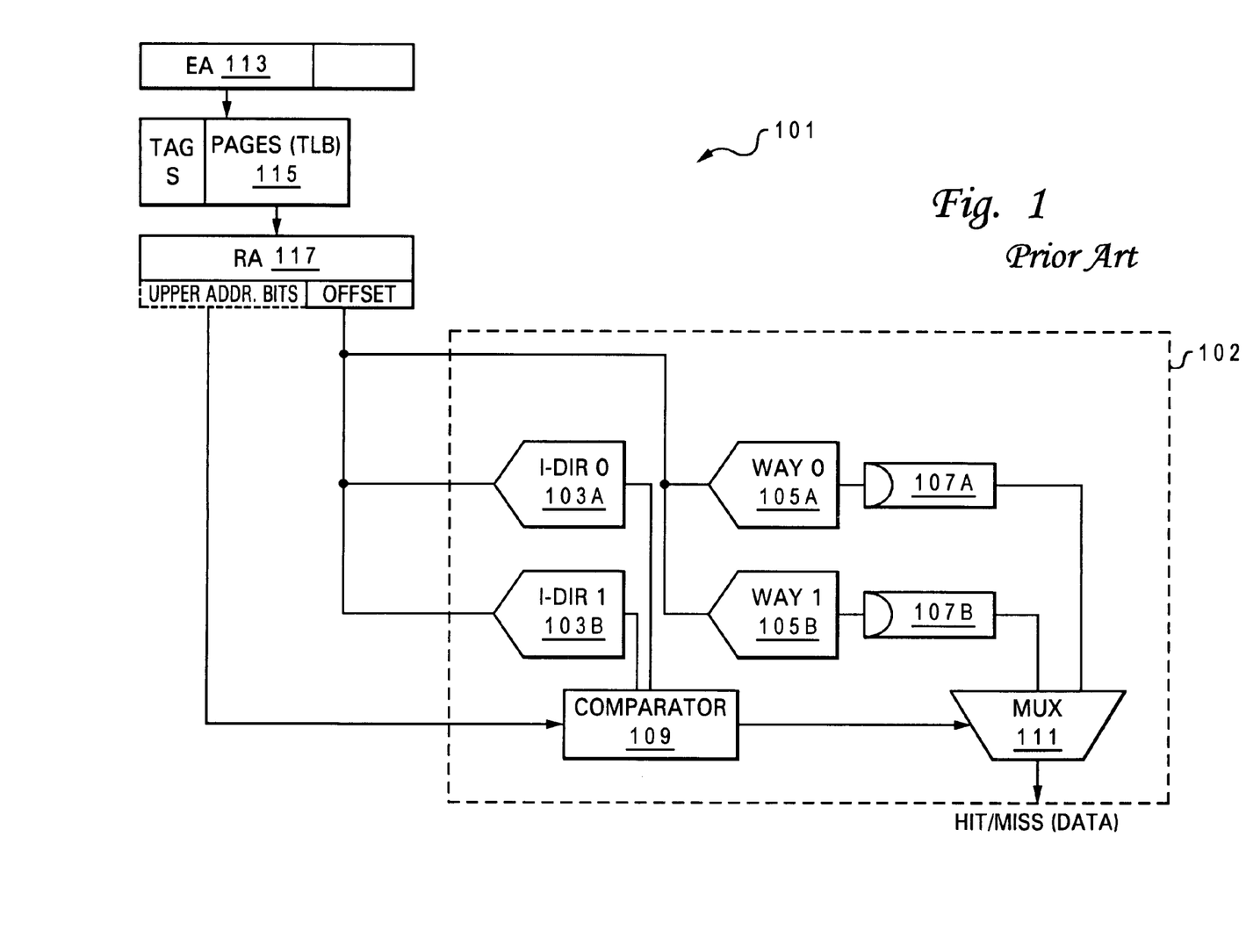
FIG. 1 is a block diagram of a two-way set-associative cache structure with an address input according to the prior art.

FIG. 1 illustrates a cache subsystem that comprises conventional two-way set-associative cache, having two ways or sets. Data having the same lower order bits of the effective address (EA) (which are not translated during address translation) and thus utilized to access the I-directory) may be held concurrently in multiple ways of the cache 102. The block (cache line) of instructions are pre-fetched utilizing the lower order bits of the EA and held in latches 107A and 107B until one of the ways is selected. Each way includes directory, I-Dir0 103A and I-Dir1 103B, respectively and array, array0 105A and array1 105B, respectively. Both arrays are addressed by some set of bits, which are normally the lower order address bits.

Set associative cache 102 further comprises additional components, including comparator 109 and MUX 111. Comparator 109 is utilized to compare the real address (i.e., the real page number) found in the address register 117 with the real address within I-Dir 103A and I-Dir 103B during way selection. Comparator 109 then provides an output that is utilized to select the particular way (array0 or array1) from which to load the cache line of instructions.

Generally, the set-associative cache-management method provides one-cycle reads, which involve accessing data from multiple sets (or ways) in parallel before a tag match is determined. Once a tag match is determined, the tag is used to select one of the accessed cache memory locations to be coupled to the processor for the read operation.

Matching the lower order address bits of the EA within the request (i.e., the offset bits, which are not translated and which are utilized to access the I-directory) and the address tag of the array, array0 105A or array1 105B results in the buffering of the corresponding instruction block to be outputted from the particular array. The real page number of real address (RA) from RA register 117 is compared by comparator 109 with the real page number of the RA within the I-directory to determine whether the buffered instruction block is the instruction block being requested. In this manner, the data is either allowed to continue being read or a read miss at the I-cache is signaled. Those skilled in the art are familiar with the structure and operational features of the set associative cache illustrated herein.

Real addresses are required during operation of set-associative cache 102. Since the processor's memory access operations are issued with effective addresses, an effective-to-real address translation or look-up is required at some point during the completion of the way selection. Normally, the address translation involves measurable latency, but the latency is accepted as a necessity to complete standard processor-driven cache-to-memory address mapping. In some systems, address translation pairs (i.e., real and effective address pairs) are stored within an Effective-to-real Address Translation table (ERAT) 115, which is utilized to enable faster access. According to FIG. 1 and, as is known by those skilled in the art, EA 113 is issued to cache subsystem 101, and corresponding RAs are found by looking up the EAs in ERAT 115. The look-up of RA is completed concurrently with the access to the I-Dir. All of the ERAT real addresses are compared to the RAs from I-Dir 103A and I-Dir 103B. If an ERAT RA matches an I-Dir RA and the corresponding EA in the ERAT matches the fetch address, then a "hit" occurs in the I-cache.

Additionally, in some current cache designs, an additional effective address (EA) directory is utilized to provide a prediction mechanism for predicting whether particular instructions being requested are likely to be resident in the I-cache. The EA directory contains a truncated portion/subset of each EA corresponding to a particular line of the physical memory that is stored within the I-cache. Because the size of the I-cache is relatively smaller than that of physical memory, finding data in an I-cache can typically be accomplished by checking the lower address bits of the EA, with some restrictions. These restrictions arise because, although the EA Directory must contain a similar lower order address as the requested data for the data to be present in the I-cache, a hit in the EA Directory does not imply that the requested data is actually present in the I-cache. A matching of lower-order EA bits is therefore necessary for a cache hit, but not sufficient on its own to confirm that the data is actually within the I-cache.

One recent improvement in data processing that affects how instructions are cached and retrieved for processing is the implementation of multi-threaded processor operations, including simultaneous multi-threaded processor operations. Program applications executing on the processor are executed as a series of threads. Each threads comprises a sequence of instructions. At any given time, information from multiple threads may exist in various parts of the machine. For example, with two executing threads, both threads appear to the OS as two separate processors. Each of the two threads thus have their own copy of all the normal registers that a program can access and/or modify.

Each thread may be working on the same task, or each thread may be working on a different task. That is, the threads can be components of the same application/program. In some implementations, multiple copies of the same program are executed concurrently, and each copy provides its own set of threads. However, the threads are generally not of the same program.

When two programs are run concurrently, processor resources are better utilized. For example, (1) as one program waits for data from memory, the other program is able to proceed out of the cache, or (2) if both programs are running out of the cache, one program may utilize lots of floating point resources, while the other program utilizes lots of fixed point resources. The net result is better utilization of the processor resources.

Often, the two threads do not share the same EA-to-RA translation. However, because it is common for certain EAs to be utilized and re-utilized, threads of different application with different RAs are often given the same EAs. For example, the linker may always start at EA 20000 when a program begins loading irrespective of whether or not another thread (of another program) has been assigned the EA 20000. However, these EAs map to different physical addresses in the physical memory space. Thus, in the multi-threaded environment, different threads from different applications utilizing processor resources may share the same EAs but because they map to different RAs, the threads cannot be handled in the same manner by the way-select mechanisms of the I-cache particularly those that include an EA directory and associated prediction features.

When multi-threaded operations are carried out on a data processing system configured with set-associative I-caches and these operations involve concurrently executing applications, whose threads share EAs, the conventional way prediction mechanisms referenced above are not always capable of efficiently providing correct way selection for each thread. With the above mechanism, the particular way in which a cache line of the first application is selected would also be selected as the way for a second application that maps to a different RA when the lower-order bit selection is utilized.

Thus a problem is encountered with current implementation of the way predictor scheme when I-cache arrays contain entries of multiple threads that may share similar EAs. Notably, in some situations, i.e., when both threads are from the same application, it is important that both threads be able to share I-cache entries since both threads have the same translation of effective to real addresses. Within a multiple application environment, however, this sharing of cache lines would cause the I-cache to thrash, i.e., the application gets repeatedly kicked out of the cache, resulting in very slow processing of the application. Both ways are prevented from hitting in the same EA Dir. If there is a hit in the EA Dir and a miss in the cache, that new data is loaded into the same way. Thus, if both threads were utilizing the same EA, the two threads would constantly replace each other instead of one being in one way and the other being in the other way.

One possible method of providing correct multi-threaded way-prediction involves storing the thread ID in the prediction array and then requiring the thread ID to also match in order to select that way. Implementation of this method, however, prevents the sharing of entries between the threads of the same application and this sharing of entries is beneficial to same-application thread processing.

The present invention thus recognizes that it would be desirable to provide a method, system, and cache architecture that enables efficient and accurate way-prediction when threads of different applications share lower order bits of EA but map to different RAs. A set-associative cache architecture that provides a mechanism for identifying which way each thread executing on a processor maps to in order to enable correct predictive way selection for threads that share EAs, which map to different RAs would be a welcomed improvement. The invention further recognizes that it would be beneficial to reduce the latencies involved in the late select process of conventional set-associative caches. These and other benefits are provided by the invention described herein.

SUMMARY OF THE INVENTION

Disclosed are a system, method and set-associative caching mechanism within a processor of a data processing system, which enables efficient way prediction and early selection in a set-associative cache of a processor that is executing instructions of multiple threads, some of which may be tagged with the same effective addresses (EAs). A set-associative I-cache topology is designed that comprises at least two ways, each having corresponding I-directory and array. The I-cache further includes a Multiplexor (MUX) that receives data input retrieved from the array of each of the ways and a control/select input from an EA way prediction logic. Each way of I-cache also includes an EA Directory (EA Dir) utilized to predict a cache hit, and which includes a series of register entries/bits (thread valid bits) individually assigned to one of multiple threads executing on the system (processor) within which the I-cache is operational.

Particular ones of the thread valid bits are set in each EA Dir to indicate when an instruction block of an executing thread is cached within the particular way to which the EA Dir is associated. Thus, when instructions of two threads that share similar EAs, which translate to different RAs (e.g., threads of different applications) are stored within the I-cache, the instruction blocks are stored within different ways of the I-cache to avoid selecting of an incorrect instruction block when predictive way selection is completed using the EA-Dir. Utilization of the EA-Dir with thread valid bits enables early selection of the correct way in which instructions of the thread being scheduled are stored. The data retrieved from that way is selected when a cache hit is predicted, and the prediction is later confirmed by a compare of both the entire EA and corresponding RA of the request with the EA from the translation table and the RA from the I-Directory.

Additionally, the hardware detects when an access would have resulted in an I-cache hit (i.e., same effective address and same real address) but was not a hit because the thread valid bit was not set in the prediction array. When this occurs the prediction array is updated such that the thread valid bit is set for the thread that is making the new access, as well as keeping any thread valid bits set that were already set. Once the prediction array is updated, that I-cache entry can be shared between the threads. This enables multiple threads that share EAs to both utilize the prediction array without recording a false cache miss.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 2:
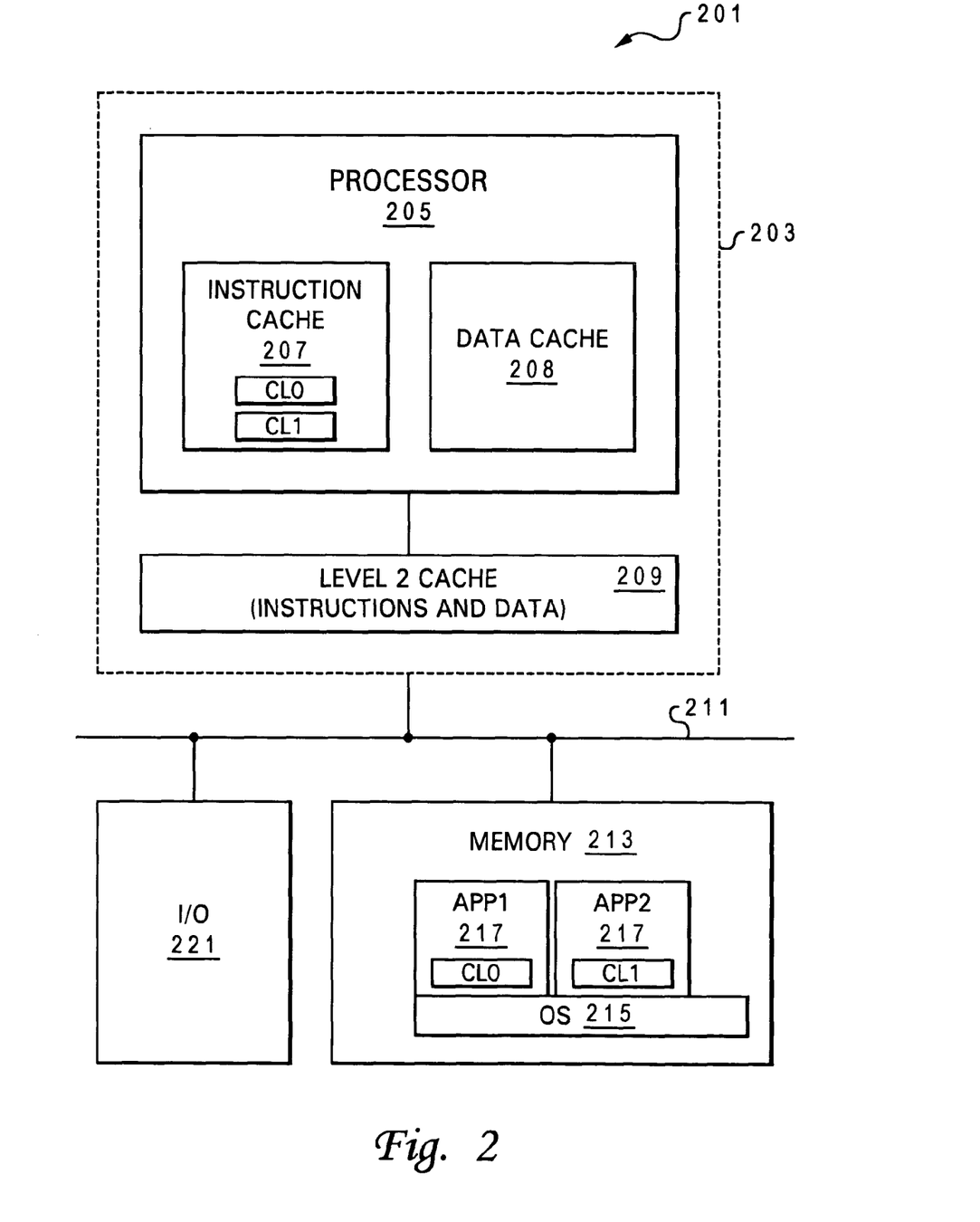
FIG. 2 is a block diagram of a data processing system with a multi-level cache system within which the features of the invention may advantageously be implemented.

With reference now to the figures and in particular with reference to FIG. 2, there is illustrated a block diagram of the main components of a data processing system within which the features of the invention may advantageously be implemented. Data processing system 201 includes processing unit 203, input/output (I/O) devices 221 and memory 213 coupled together via interconnect (or system bus) 211.

Processing unit 203 includes processor 205 having a plurality of registers and execution units (not shown), which carry out program instructions in order to operate data processing system 201. In addition to execution units, processor 205 includes on-board instruction cache (I-cache) 207 and data cache (D-cache) 208. These I-cache 207 and D-cache 208 are referred to as "on-board" since they are integrally packaged with the registers and execution units of processor 205, and they respectively include instructions and data retrieved from memory 213.

Processing unit 203 also includes Level 2 (L2) cache 209 that supports the on-board Level 1 (L1) caches (207 and 208). In other words, L2 cache (209) acts as an intermediary between memory 213 and on-board caches (207 and 208), and can store a much larger amount of information (instructions and data) as compared to the on-board caches.

Although illustrated as bi-furcated I-cache 207 and D-cache 208, the on-board caches may be represented as a single L1 cache storing both instructions and data. The present invention is described with specific reference to set-associative I-caches, irrespective of whether the I-cache is separate from the D-cache or both instructions and data are stored within a single, combined L1 cache. According to the invention, at least I-cache 207 is a set-associative cache.

Figure 3:
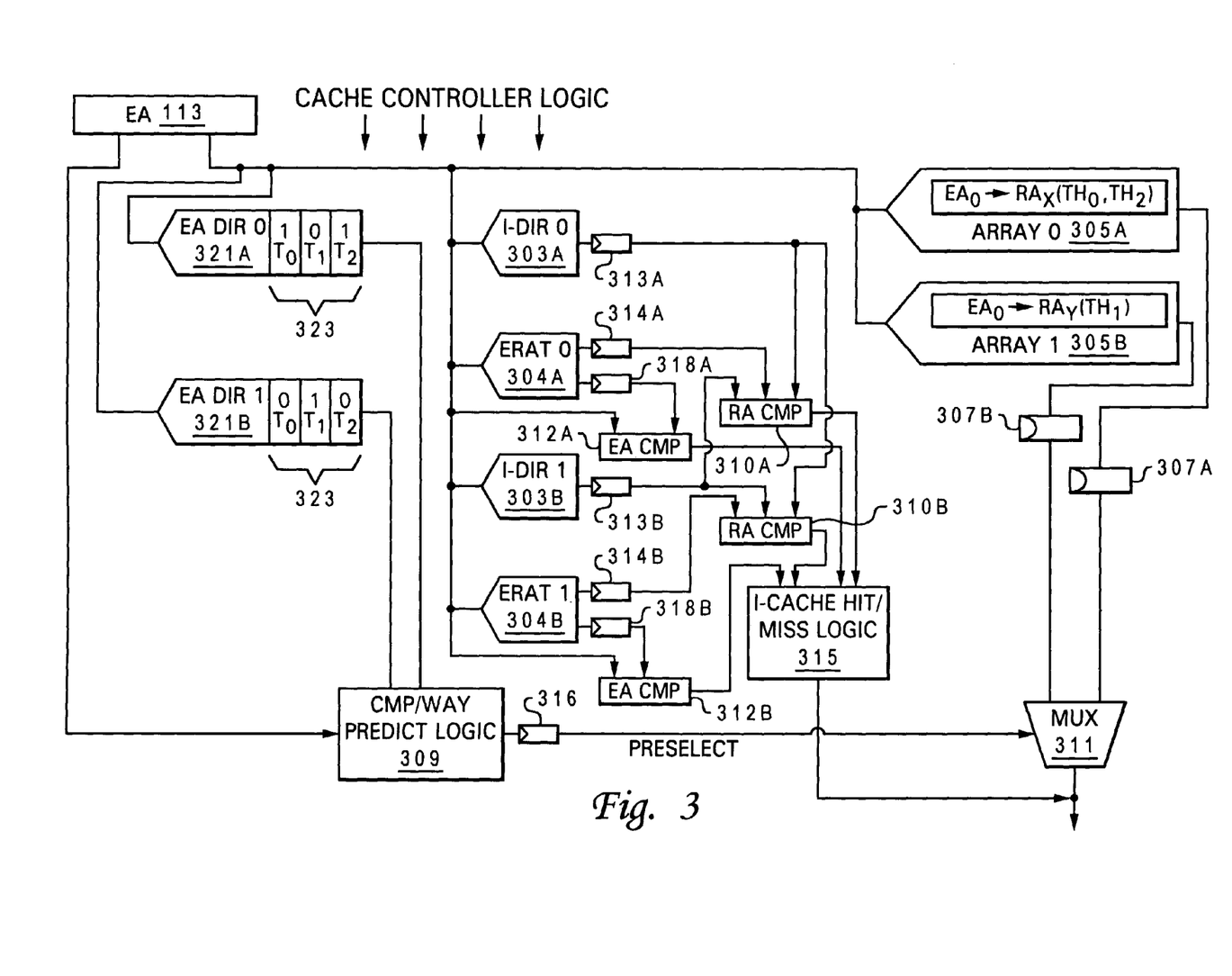
FIG. 3 is a block diagram of a two-way set-associative cache configured with Effective Address (EA) Directories that include thread valid bits and other associated logic according to one embodiment of the present invention.

In the illustrative embodiment, I-cache 207 is designed as illustrated by FIG. 3 and described below. Although FIG. 2 depicts only a two-tier level cache hierarchy, the present invention is equally applicable to multi-level cache hierarchies that includes additional levels of serially-connected caches.

Stored within memory 213 are the program code for various software components, indicated as blocks. Among these software components are operating system (OS) 215 and first and second application 217 (app1 and app2). Program instructions of each first and second application 217 are executed by processor 205 to complete the application's processes/tasks. In order to execute the applications, the instructions of the particular application are fetched (or pre-fetched) from memory and some of the instructions stored within I-cache 207 until requested by processor 205.

FIG. 2 illustrates an exemplary cache line of instructions of app1 and app2 that are copied within I-cache 207. Also, according to the invention, processor 205 operates as a multi-threaded processor and schedules threads of both first and second application 217 for execution utilizing one of several available scheduling schemes for multi-threaded operations. When a thread is being scheduled, processor 205 issues a request for the instructions of that thread, which are then fetched from I-cache 207 (or memory 213) and sent to the execution units for processing.

The above illustration and description of data processing system 201 is meant solely for illustrative purposes and not meant to be limiting of the invention. Those skilled in the art would further appreciate that there are other components that might be used in conjunction with those shown in FIG. 2. For example, a memory controller can be used to access memory 213, etc.

EA Directory and Thread-Based Predictive Way Select

The present invention provides a set-associative cache structure that completes early prediction and fast way selection via a special directory structure that tracks both the effective addresses (EA) of cache lines stored within the cache and the threads executing on processor 205. The early prediction is completed by a comparison of a portion of the EA, which is also utilized to trigger the buffering of cache lines for selection from the particular way(s) with matching lower-order bits of the EA. According to the present invention, a cache hit and way selection are predicted by an EA directory (EA-Dir) utilizing thread-specific information stored within the EA Directory.

The invention enables accurate, thread-specific way selection in a multi-threaded processing environment. EAs within the EA directory are utilized to complete EA compares for prediction of a cache hit and actual way selection is based on which thread is being scheduled. To support the way prediction for multi-threaded operation, multiple EA directories are provided to enable predictive address look-up and comparison utilizing EAs. Additionally, the EA directories are enhanced to provide specific way selection for the particular way in which the instructions of the executing/scheduled thread are stored. Each EA directory is affiliated with one of the ways, and each EA directory contains the EAs identifying the cache lines stored in the array of the affiliated way. Finally, each EA directory includes a tracking mechanism for identifying the thread, whose instructions are cached in the array associated with that way.

FIG. 3 illustrates a set-associative cache designed according to one embodiment of the present invention. In the illustrative embodiment, set-associative I-cache 207 is divided into two ways/sets. Each way comprises an instruction array, array0 305A and array1 305B, and respective instruction directory, I-Dir0 303A and I-Dir1 303B. Additionally, each array, array0 305A and array1 305B, has respective latch 307A and latch 307B, which temporarily stores the retrieved cache line that serves as one input to way select Multiplexer (MUX) 311. Associated with I-Dir0 303A and I-Dir1 303B are respective effective-to-real address tag registers, ERAT0 304A and ERAT1 304B. I-Dir0 303A and I-Dir1 303B contain the entire real address tags for the cache lines within the associated arrays, array0 305A and array1 305B. ERAT0 304A and ERAT1 304B contain the effective and real address pairs for each instruction block (cache line) stored within array0 305A and array1 305B, respectively. Completion of the various access operations within I-cache 207 is controlled by cache controller logic, which may utilize least recently used (LRU) array and other logic components. LRU is an array structure (or algorithm) that is used to determine which way in the I-cache new data should be put into, i.e., if there are two ways and a new entry is being brought in, one entry within one of the ways has to be replaced. The LRU is utilized to replace the entry that has been used least recently. Utilization of the LRU following a miss in the cache is described below in the description of FIG. 4.

Also included within I-cache 207 and associated with respective ones of array0 305A and array1 305B are EA Dir0 321A and EA Dir1 321B. EA Dir0 321A and EA Dir1 321B are smaller that I-Dir0 303A and I-Dir1 303B because each EA Dir holds only a subset/portion of the entire EA corresponding to the complete RA stored in the I-Dir of the same way. For example, EA Dir0 312A may be 10 bits wide, while I-Dir0 303A may be more than 44 bits wide. In one implementation, the RA comprises 44 bits which include 12 bits of page offset. The tag in the I-Dir is thus 32 bits. EA Dir0 321A and EA Dir1 321B thus provide faster look-up than I-Dir0 303A and I-Dir1 303B. The faster look-up is also achieved because compares at EA Dir 321A and EA Dir 321B do not require (or have to wait for) an address translation look-up, while compares at I-Dir0 303A or I-Dir1 303B requires a translation look-up.

A series of thread valid bits are allocated within (or appended to) EA Dir 321A and EA Dir1 321B. Each EA entry of EA Dir0 321A and EA Dir1 321B includes a series of bit registers appended thereto. Each bit is allocated to a respective one of the multiple threads being scheduled by the processor. As shown, EA Dir0 321A and EA Dir1 321B include a series of thread valid bits 323 in a thread identifier (ID) field, one for each thread being executed on the system. These thread valid bits 323 are updated in EA Dir0 321A and EA Dir1 321B for each possible thread, Th0, Th1, etc whose instructions are stored in that particular way.

Additional components are illustrated within FIG. 3, that enable the actual thread-based way select to proceed. Among these components are CMP/predict logic 309 and I-cache hit/miss logic 315. CMP/predict logic 309 determines whether to predict the requested instruction block is present in I-cache 207 and also which way is associated with the thread whose instruction block is being requested. Notably, although illustrated as a separate component from EA-Dir0 321B, CMP/way predict 309 may be implemented within control logic for EA-Dor0 321A and EA-Dir1 321B. Further, thread valid bits 323 may be stored within CMP/way predict logic 309. I-cache hit/miss logic 315 receives the results of the EA CMPs 312A, 312B and RA CMPs 310A and 310B as described in detail below.

The cache lines of instruction with matching lower address bits are staged within latch 307A and 307B for selection at MUX 311. The selection of the staged cache lines of instruction is completed by select signal generated from CMP/Way predict logic 309 and staged at latch 316. CMP/Way predict logic 309 issues a select signal to latch 316 and ultimately MUX 311, but the select signal is issued only if the lower order of bits of the EA of the request matches that within EA Dir and a thread valid bit is set for the particular thread in that way. The select signal selects the way corresponding to that of the EA Dir in which the thread valid bit is set. This embodiment operates as well for processors performing operations on multi-threaded single application as well as with multi-threaded operations for multiple applications. According to the illustrative embodiment, the input addresses to the cache and thus the inputs to each of the illustrated components are EA 113 for the cache line being requested. The lower order bits of the EA are sent to each one of the major components of I-cache requiring an address input, including EA-Dir0 321A, EA-Dir1 321B, I-Dir0 303A, I-Dir1 303B, ERAT0 304A, ERAT1 304B, array0 305A, array1 305B, and EA CMP 312A and 312B. Thus, while the lower order bits of EA are being compared with EAs in EA Dir1 321B, these bits are utilized to trigger retrieval from array0 305A and/or array1 305B of a cache line tagged with the same lower order address bits. RAs having similar lower order address bits are also retrieved from I-Dir0 303A and/or I-Dir1 303B. Meanwhile, the EA 113 is matched within ERAT0 304A and/or ERAT1 304B, and the corresponding RA is copied to latch 314A. RA from I-Dir0 303A and RA from I-Dir1 303B are then compared against corresponding RAs from ERAT0 304A and ERAT1 304B, respectively. The comparisons are completed by CMP 310A and CMP 310B.

Outputs of I-Dir0 303A and I-Dir1 303B comprises RAs having similar lower-order address bits as the EA 113 of the request accessing I-cache 207. These RA outputs are stored within latch 313A, 313B and respectively serve as first and second inputs to RA comparator (CMP) 310A, 310B. Third input to each RA CMP 310A, 310B is the RA retrieved from ERAT0 304A and/or ERAT1 304B, respectively, which correspond to the translated EA 113 of the request.

The EA (or portions thereof) within ERAT0 304A and/or ERAT1 304B is also compared by EA CMP 312A, 312B to EA 113 of the request. The results of each of the corresponding comparisons, i.e., results from RA CMP 310A and corresponding EA CMP 312A and/or results from RA CMP 310B and corresponding EA CMP 312B are ANDed together within I-cache hit/miss logic 315. I-cache hit/miss logic 315 determines when a cache hit occurs within I-cache. A cache hit occurs only when both EA compares and RA compares within a particular way results in a match. When the compares fail to yield a match of both the EAs and RAs, the already selected I-cache block of instructions is discarded, and the LRU is triggered to respond to the cache miss by retrieving the data from lower memory (or another cache line of). Notably, however, by the time the cache hit is identified, the cache hit prediction and way selection has completed and the instruction block within the selected way has begun transmission on the bus to the processor's execution units. The RA is only involved in the determination of whether or not a cache hit occurs and is not involved in the determination of way selection/prediction. The instructions within the predictive way are selected before the determination is made whether the requested cache line of instructions is actually within the I-cache.

EA directory logic (not specifically shown) within EA Dir0 321A and EA Dir1 321B is provided to enable the setting of the correct bit for the thread being accessed and subsequent evaluation of whether the requested instruction block is resident in one of the ways of I-cache 207. The thread valid bit is set for the particular thread that accesses the data corresponding to an EA in a particular EA directory address. The EA directory logic (or state machine in hardware) updates the thread valid bit within an EA Dir following a store of a cache line (retrieved/copied from memory) of that thread in the corresponding way. The update indicates that the cache line belongs to a specific thread whose instructions are stored in the corresponding array.

If a new thread with a similar EA that maps to a different RA is scheduled and instructions of that thread are retrieved from memory (i.e., following a conventional cache miss), then the LRU updates the I-cache by storing the retrieved instruction block of the thread in the other way since the thread has a different RA. If a thread with the same RA is accessing the I-cache, then the state machine is updated. When LRU is used for replacement, if the similar entry is currently being used that entry will not be the LRU entry and thus the two similar entries can each be in different ways. If the similar entry happens to be the LRU then that entry would just get replaced and there would not be an EA conflict.

During way select, the EA directory logic determines which thread is selected and only looks at the thread valid bit associated with the particular thread accessing the directory (e.g., bit 0 for Th0, etc.). That is, the EA directory logic requires the specific thread bit in the prediction array to be set for the thread that is requesting the access, and ignores all other thread bits in the prediction array for threads that are not presently requesting access.

The implementation of multiple EA Dirs thus enables the way selection process to be extended to include multi-threading for different applications running concurrently on the system. The invention provides a solution to the problem that arises with multi-threaded operations in which threads from different applications that are assigned the same EAs are being scheduled for execution by the processor.

The actual total number of bits provided is a design parameter based on the number of concurrently running threads that the processor is designed to support. In one implementation, a separate register having a large number of bits is provided to accommodate the largest possible number of concurrently executing threads. The control logic of the EA-Dirs accesses the register in sequential fashion and allocates each thread to one bit within the register. The remaining bits in the register may be considered "don't cares."

In the illustrative embodiment, registers for three threads, Th0, Th1, and Th2 (representing Threads 0, 1, and 2) are provided corresponding to three threads being scheduled by the processor. For illustrative purposes, Th0 and Th2 are assumed to be threads of the same application (e.g., App1) and thus share the same EA-to-RA translations. Th1 is from a different application (App2) and is assigned the same EAs as Th0 and Th2. However, the EAs of Th1 map to a different RA from those similar EAs of Th0 and Th2. In order for the instruction associated with these threads to be correctly selected using the EAs, the threads that share the same EA, but map to different RAs are allocated to different ways in the I-cache. Control logic (LRU, etc.) of I-cache manages the allocation of fetched lines of instructions (or instruction block) from lower memory to particular ways assigned to specific applications/threads of particular applications. Thus, for example, instructions for Th0 and Th2 are stored in array0, while instructions for Th1 are stored in array1.

Once these instructions are stored in different ways, a method for selecting only the way corresponding to the correct thread is required since way prediction which involves simply matching the EAs would predict a cache line from both arrays when threads share similar EAs irrespective of the indifferent RAs. Thus, with the I-cache configuration illustrated by FIG. 3 and specifically with a thread valid bits register appended to EA Dir0 321A and EA Dir1 321B, the invention provides a hardware implementation that enables a software way-select logic that is able to accurately select a different way for retrieving instructions of Th0 and Th1 tagged with similar EAs that map to different RAs.

Process Flow

Figure 4:
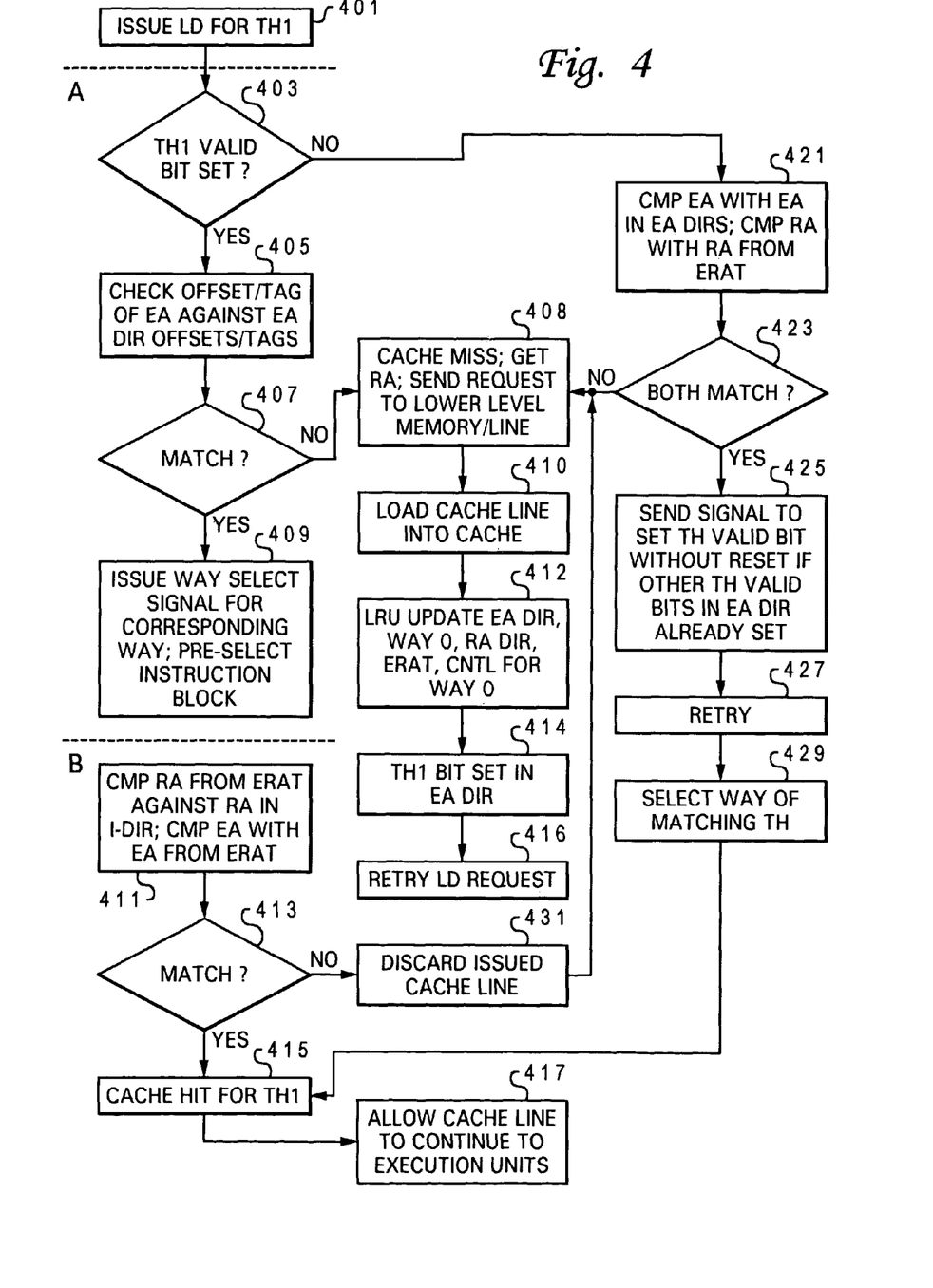
FIG. 4 is a logic flow diagram illustrating the processes involved in providing correct way selection in a multi-threaded environment utilizing the cache structure provided in FIG. 3 according to one embodiment of the present invention.

FIG. 4 provides an illustration of the logical flow of multi-threaded operations completed by the two-way set associative I-cache of FIG. 3. Although depicted in a sequential fashion, the sequence of the blocks in FIG. 4 does not represent a time sequence of operations. In fact, many of the functions may occur in parallel (concurrently). For example, the compare function in block 411 actually commences about the time the check for the thread valid bit is made in block 403. The process is described with reference to the example provided above where Th0 and Th2 are threads of a first application and share the same EAs and RAs while Th1 is a thread of a second application that has similar EAs (lower order bits) as Th0 and Th2 but different RAs.

The following description assumes that Th1 is being scheduled and the instructions are to be fetched from I-cache 207. Also assumed is that the allocation of threads to a particular way are tracked/identified utilizing the EA Dir configuration of FIG. 3, with at least three thread valid bits in each EA-Dir, each bit allocated to a particular one of the three threads. Notably, when the processor first retrieves a cache line from memory (following a miss at the I-cache) for Th0, Th1, or Th2 and stores the cache line of instructions in the I-cache, the thread valid bit of the EA directory associated with the way receiving the cache line for storage in its array (i.e., array0 305A for Th0 and Th2 and array1 305B for Th1) is set by EA directory logic.

When the processor selects Th1 for execution, EA directory logic checks only the second thread-tracking bit, which is allocated to Th1, to determine if the instruction block for Th1 is in that particular way. The first bit and bits subsequent to the second bit are ignored. Scheduling of the particular thread for execution results in selection of a cache line of instruction from a particular way based on which of the thread valid bits is set and the EA of the requested instruction block.

Turning now to FIG. 4, the processor issues an address operation (or request) to I-cache 207 requesting a cache line of instructions for Th1 as indicated at block 401. The request includes the EA of the cache line. EA directory logic first determines at block 403 whether the thread valid bit for Th1 is set in either of EA Dir0 321A or EA Dir1 321B. Notably, if the thread valid bit is set in one EA Dir, but not in the other EA Dir, the way associated with the EA Dir with the thread valid bit set is predicted as the correct way, and thus the way prediction/selection occurs at the beginning stages of cache line retrieval within the I-cache.

Once the correct EA Dir with the thread valid bit set for Th1 is identified, the EA comparisons proceed. CMP/way predict logic 309 compares the lower order bits of the EA within the request against the corresponding bits retrieved from within the address registers of EA Dir 321B as shown at block 405, and a determination is made at block 407, whether the lower order address bits of these two EAs match.

When the EA matches at CMP/way predict logic 309 and the thread valid bit is set for Th1, CMP/way predictor logic 309 issues a predicted way select signal, as indicated at block 409. The predicted way select signal, indicates prediction of a cache hit as well as selects the correct way (array1) from which the cache line of instructions should be accepted at MUX based on the tread valid bit. The prediction and way selection occur at a very early stage in the cache access operation.

While the way prediction/selection using the EA and thread valid bits is occuring, a compare of the entire RA from the ERAT and the RA from the I-Dir and a compare of the EA from the request and the EA from the ERAT are completed as shown at block 411, and a determination made at block 413 whether the RAs and EAs match. When a match of both RAs and EAs occurs, then a cache hit is confirmed as shown at block 415, and the cache line that is in transit to the execution units is allowed to continue as shown at block 417. However, when the RAs and/or the EAs do not match, a late kill signal is sent to kill the cache line that was issued to the execution units as shown at block 431. Issuance of a late kill indicates a cache miss and the steps for responding to a cache miss are initiated.

Returning to block 407, when the EAs do not match, the cache line requested is not in the I-cache (i.e., a true cache miss). The RA corresponding to the EA of the request is obtained, and the corresponding RA is issued out of the I-cache to imitate a load request (from another cache or lower memory) as shown at block 408. The cache line is subsequently loaded into an array of the I-cache as shown at block 410. Cache controller logic (including the LRU) completes a series of updates to account for the presence of the cache line of instructions of Th1 within a particular way of the I-cache as shown at block 412. The bit associated with Th1 is set is the EA Dir1 as indicated at block 414, and the load request is retried as indicated at block 416.

Returning now to block 403, when the valid bit is not set in either of the EA-Dirs, the checks of both the EA address and RA address associated with the request against the Ea address and RA address in I-Dir and ERAT, respectively, are completed as shown at block 421 in order to confirm whether an actual miss has occurred.

If the EAs match but the RAs don't match or vice-versa, then a cache miss has occurred as indicated at block 408. The cache line in the I-cache belongs to a thread of a different application being executed. If, however both addresses match, then the thread belongs to the same application as another thread whose valid bit is already selected in the EA-Dir. As shown at block 425, a signal is sent to the EA Dir logic to set the thread valid bit for the particular thread without resetting the valid bits already set for another thread in that EA Dir.

This scenario occurs when different threads of the same application sharing both EAs and RAs are scheduled but only the first thread has the bit set in the EA Dir linked to the correct way. The request is re-tried as indicated at block 427 rather than being registered as a cache miss. During the retry, the way select logic is made to select the cache line in an array within the way in which the first thread sharing both EA and RA with the current thread is located as shown at block 429. The cache line is then selected by the MUX 311 and sent to the processor execution units.

Overview

The invention scales with the number of ways to accommodate larger configurations of I-cache systems. The number of valid bits provided for each EA Dir correlates to the number of active threads that may be supported by the processor. This may be accomplished by providing a total number of valid bits for each EA Dir equivalent to the largest possible number of concurrently executing threads on the processor.

In one embodiment, feedback capabilities are associated with CMP/way predict logic 309, and selection of array0 305A triggers logic components of array1 305B to abandon further retrieval of data from array1 305B. All other associated activity began in that way is automatically halted and resulting RA and data are discarded.

Another illustrated and described embodiment provides two EA-Dirs for the 2-way set associative cache design. However, in one other implementation of a 2-way set associative design, a single EA-dir is provided associated with one of the ways. An EA is checked against that EA-Dir, and the CMP/predict logic selects the other way if the EA misses in that EA-dir. However, this embodiment does not provide an early hit prediction.

One alternative solution utilizes a single bit, in which a valid bit is provided to the EA directory. However, with this implementation, the same RA output will always be outputted for a particular EA. Another alternate solution involves matching the thread with the associated EA directory (i.e., adding the thread ID to the EA directory) when the same EA has different RA. However, this implementation introduces unnecessary latency and unnecessary use of data bus resource, which is not ideal when the EA of different cache lines have the same RA.

As described in the background, most cache accesses and way selection utilize the RA of the instructions, and the process necessarily involves a pre-translation of the EAs provided by the processor to the RAs of the stored instructions in the cache or memory. For example, in order to map to physical memory, the real address may comprise 44 bits (plus several control bits). Of the 44 effective (effective added) address bits, the lower order 12 bits contain the page offset (tag) of the instruction being addressed, while the upper 32 bits must be translated to determine what the correct Real Page Number should be. These lower order 12 bits are not translated and typically correlate to the lower-order bits of the EAs. The above example, including the specific bit counts, is provided merely for illustration and not meant to be limiting on the invention.

The present invention removes the latencies involved in the way-select process relying on a RA by providing an associated EA Dir for each way utilizing only the lower-order bits of EAs to complete the initial comparisons and subsequent way prediction (based on which thread is seeking the access to the I-cache). Since the way predictor is indexed by the same address bits as the I-cache and stores some EA bits (or hashed EA bits), the I-cache way is selected before the full address comparisons (EA and RA) are completed within the I-Dir. Notably, substantially little or no timing delay is added to the way selector because the EA-Dir access and EA compare is as fast as the access of the large instruction array the thread checking features occur while the RA comparison is being completed.

In the case of a read operation, the cache access can be hastened by starting the data access before an EA and RA match is determined. While checking the relevant EA tags and corresponding RA for a match, the appropriate data locations within each way having a matching EA tag are accessed.

While the invention has been particularly shown and described with reference to a preferred embodiment, it will be understood by those skilled in the art that various changes in form and detail may be made therein without departing from the spirit and scope of the invention. For example, although the invention is described by way of embodiments with two-way set associative caches, the invention may be implemented in other N-way set-associative caches.

What is claimed is:

1. An N-way set associative cache within a processor of a data processing system designed for multi-threaded operation, said cache comprising:
    a first effective address (EA) directory and a second EA directory, each corresponding to a respective one of a first array and a second array, said first EA directory and said second EA directory including (1) a portion of each of a plurality of effective addresses (EAs) representing EAs of a plurality of cache lines and (2) a plurality of thread valid bits associated with the EAs and each bit assigned to idebtify to which thread of a plurality of threads executing within said multi-threaded processor the EAs belong;
    means for forwarding an EA within a cache line read request associated with a particular thread of said plurality of threads to said first EA directory and second EA directory and to said first array and said second array;
    cache hit prediction logic for predicting a cache hit utilizing said EA and said portion of EAs within said first and said second EA directories; and
    way select logic for completing early selection of data from one array among said first array and said second array based on which EA directory contains a thread valid bit associated with said particular thread that is set.

2. The set associative cache of claim 1, wherein said way select logic comprises an output bus, which is coupled to a select signal input port of a multiplexer (MUX).

3. The set associative cache of claim 1, further comprising:
    a first I-directory and a second I-directory corresponding to said first array and said second array, respectively, and each containing real addresses (RAs) of the plurality of cache lines within the respective first array and second array;
    a first effective to real address translation register (ERAT) and a second ERAT respectively affiliated with said first I-directory and said second I-directory, said first ERAT and said second ERAT including effective-to-real address translation pairs for each of the plurality of cache lines stored in respective ones of said first array and said second array;
    first means for comparing said EA from said request to a second EA retrieved from one of said first ERAT and said second ERAT for an EA match; and
    second means for comparing a real address (RA) retrieved from said first ERAT and said second ERAT to a second RA retrieved from one of said first I-directory and said second I-directory for an RA match, wherein said RA is retrieved by matching corresponding EAs of EA-RA pairs within said first ERAT and said second ERAT to the EA from said request, and said second RA is retrieved utilizing shared lower order bits of said EA.

4. The set associative cache of claim 3, further comprising:
    logic for preventing utilization of output data selected at said MUX and forwarded to said processor when said first means for comparing does not yield an EA match.

5. The set associative cache of claim 3, further comprising:
    logic for preventing utilization of output data selected at said MUX and forwarded to said processor when said second means for comparing does not yield an RA match.

6. The set associative cache of claim 1, wherein further said way selection logic issues an output signal to complete the early selection at said MUX only when said cache hit prediction logic predicts a cache hit.

7. The set associative cache of claim 3, wherein further said early selection is completed prior to completion of said comparison by said first means for comparing and said second means for comparing.

8. The set associative cache of claim 3, wherein said first means for comparing and said second means for comparing are comparators.

9. The set associative cache of claim 3, wherein, responsive to a prediction of a cache hit by said cache hit prediction logic when said thread valid bit is not set within one of said first EA directory and said second EA directory, said way select logic includes logic for:
    delaying an issuance of a way select signal on the output bus to said MUX;
    monitoring a result from said first means for comparing and said second means for comparing, wherein when said first means for comparing results in an EA match and said second means for comparing results in an RA match, the way at which the match occurs is selected for retrieving requested data.

10. The set associative cache of claim 9, further comprising:
    EA directory logic that dynamically updates thread valid bits in a corresponding EA directory when said monitoring indicates both an EA match and an RA match, wherein the thread valid bit for the thread requesting the data is set and the other thread valid bits within the EA directory are unchanged.

11. The set associative cache of claim 1, wherein said data processing system includes a memory and responsive to a miss at said EA directory, said cache further comprising:
    means for initiating a response to a cache miss, which loads requested cache line data from an alternate storage location into one way of said cache;
    means for selecting a way for loading said data loaded from said memory, wherein said way is selected based on a thread to which said data belongs and a current state of thread allocation within ways of said cache; and
    logic for updating thread valid bits within a corresponding EA Directory.

12. A data processing system comprising:
    a processor designed to complete multi-threaded operations;
    a memory coupled to said processor;
    a set-associative instruction cache (I-cache) associated with said processor, wherein said I-cache includes:

a first effective address (EA) directory and a second EA directory, each corresponding to a respective one of a first array and a second array, said first EA directory and said second EA directory including (1) a portion of each of a plurality of effective addresses (EAs) representing EAs of a plurality of cache lines and (2) a plurality of thread valid bits, each bit assigned to and utilized to track which thread of a plurality of threads executing within said multi-threaded processor has corresponding EA addresses within a particular EA directory;

means for forwarding an EA within a cache line read request associated with a particular thread of said plurality of threads to said first EA directory and second EA directory and to said first array and said second array;

cache hit prediction logic for predicting a cache hit utilizing said EA and said portion of EAs within said first and said second EA directories; and way select logic for completing early selection of data from one array among said first array and said second array based on which EA directory contains a thread valid bit associated with said particular thread that is set.

13. The data processing system of claim 12, wherein said set associative cache further comprises:

a first I-directory and a second I-directory corresponding to said first array and said second array, respectively, and each containing real addresses (RAs) of the plurality of cache lines within the respective first array and second array;

a first effective to real address translation register (ERAT) and a second ERAT respectively affiliated with said first I-directory and said second I-directory, said first ERAT and said second ERAT including effective-to-real address translation pairs for each of the plurality of cache lines stored in respective ones of said first array and said second array;

first means for comparing said EA from said request to a second EA retrieved from one of said first ERAT and said second ERAT for an EA match; and second means for comparing a real address (RA) retrieved from said first ERAT and said second ERAT to a second RA retrieved from one of said first I-directory and said second I-directory for an RA match, wherein said RA is retrieved by matching corresponding EAs of EA-RA pairs within said first ERAT and said second ERAT to the EA from said request, and said second RA is retrieved utilizing shared lower order bits of said EA.

14. The data processing system of claim 13, said cache further comprising:

logic for preventing utilization of output data selected at a multiplexor (MUX) to forwarded to said processor when said first means for comparing does not yield an EA match.

15. The data processing system of claim 13, said cache further comprising:

logic for preventing utilization of output data selected at a multiplexer (MUX) and forwarded to said processor when said second means for comparing does not yield an RA match.

16. The data processing system of claim 12, wherein said way select logic of said cache comprises an output bus, which is coupled to the select signal input port of a MUX, wherein further said way selection logic issues an output signal to complete the early selection at said MUX only when said cache hit prediction logic predicts a cache hit.

17. The data processing system of claim 13, wherein further said early selection within said cache is completed prior to completion of said comparison by said first means for comparing and said second means for comparing.

18. The data processing system of claim 13, wherein said first means for comparing and said second means for comparing within said cache are comparators.

19. The data processing system of claim 13, wherein, responsive to a prediction of a cache hit by said cache hit prediction logic when said thread valid bit is not set within one of said first EA directory and said second EA directory, said way select logic of said cache includes logic for:

delaying an issuance of a way select signal on the output bus to a MUX;

monitoring a result from said first means for comparing and said second means for comparing, wherein when said first means for comparing results in an EA match and said second means for comparing results in an RA match, the way at which the match occurs is selected for retrieving requested data.

20. The data processing system of claim 19, said cache further comprising:

EA directory logic that dynamically updates thread valid bits in a corresponding EA directory when said monitoring indicates both an EA match and an RA match, wherein the thread valid bit for the thread requesting the data is set and the other thread valid bits within the EA directory are unchanged.

21. The data processing system of claim 13, wherein, responsive to a miss at said EA directory, said cache further comprising:

means for initiating a response to a cache miss, which loads requested cache line data from an alternate storage location into one way of said cache;

means for selecting a way for loading said data loaded from said memory, wherein said way is selected based on a thread to which said data belongs and a current state of thread allocation within ways of said cache; and logic for updating thread valid bits within a corresponding EA Directory.

22. In a data processing system that includes a processor running multi-threaded operations and an N-way set-associative cache having N arrays, N effective address (EA) directories with thread valid bits associated with each entry, N I-directories each corresponding to a particular way, and a multiplexer (MUX) and compare logic, each array organized into a plurality of lines of instruction, each line identified by an address tag, wherein when an array receives an address input that matches one of said address tag, said array outputs an associated line of instructions as an input to said MUX, a method for enabling early way-prediction and correct way selection when threads share effective addresses (EA), said method comprising:

receiving at said EA directories a cache line read request of a first thread with a request EA;

checking among said EA directories for a match of a predetermined portion of said request EA within the EA directories;

determining which one of said EA directories has a thread valid bit set for the first thread, wherein each directory has a particular thread valid bit set identifying the thread for which that EA directory provides effective to real address translations; and selecting a way corresponding to the EA directory that has said thread valid bit set for the first thread.

23. The method of claim 22, further comprising:
predicting a cache hit within said cache when said match is found within said EA directories; and
wherein said selecting a way is delayed when said match is not found within said EA directories.

24. The method of claim 23, wherein, when said match is not found within said EA directories, said method further comprising:
comparing the request EA to entire EAs associated with said plurality of lines of instructions within said I-Dir for an EA match;
comparing a corresponding RA translated from the request EA to an RA within said I-directories for an RA match; and
selecting a way from which both said EA match and said RA match occurs.

25. The method of claim 24, further comprising:
when both said EA match and said RA match occurs within a particular way, setting a thread valid bit for said first thread within a corresponding EA directory of said particular way.

26. The method of claim 22, further comprising:
when both said EA match and said RA match does not occur within a particular way, initiating a cache miss response protocol to retrieve a cache line from an alternate source into said I-cache.

27. The method of claim 26, further comprising updating a thread valid bit of said first thread within a way in which the retrieved cache line is stored in the I-cache.

28. A 2-way set associative cache within a multi-threaded processor of a data processing system, said cache comprising:
a first effective address (EA) directory and a second EA directory, each corresponding to a respective one of a first array and a second array, said first EA directory and said second EA directory including (1) a portion of each of a plurality of effective addresses (EAs) representing EM of a plurality of cache lines within respective arrays and (2) a plurality of thread valid bits linked to the EAs and utilized to identify which thread of a plurality of threads executing within said multi-threaded processor has cache lines stored within a specific one of the first and second array;
means for forwarding an EA within a cache line read request associated with a particular thread of said plurality of threads to said EA directory and to said first array and a second array; and
way select logic for completing early selection of data from one array among said first array and said second array based on whether the EA directory contains a thread valid bit associated with said particular thread that is set, wherein said data is selected at a multiplexer (MUX) and forwarded to said processor from said first array only when said EA directory contains said thread valid bit set.

29. The set associative cache of claim 28, wherein further, when said thread valid bit is not set within said EA-Dir, said data is selected from said second array.

30. The set associative cache of claim 28, wherein said way select logic comprises an output bus, which is coupled to the select signal input port of said MUX.

31. The set associative cache of claim 28, further comprising:
a first I-directory and a second I-directory corresponding to said first array and said second array, respectively, and each containing real addresses (RAs) of the plurality of cache lines within the respective first array and second array;
a first effective to real address translation register (ERAT) and a second ERAT respectively affiliated with said first I-directory and said second I-directory, said first ERAT and said second ERAT including effective-to-real address translation pairs for each of the plurality of cache lines stored in respective ones of said first array and said second array;
first means for comparing said EA from said request to a second EA retrieved from one of said first ERAT and said second ERAT for an EA match; and
second means for comparing a real address (RA) retrieved from said first ERAT and said second ERAT to a second RA retrieved from one of said first I-directory and said second I-directory for an RA match, wherein said RA is retrieved by matching corresponding EAs of EA-RA pairs within said first ERAT and said second ERAT to the EA from said request, and said second RA is retrieved utilizing shared lower order bits of said EA.

32. The set associative cache of claim 31, further comprising:
logic for preventing utilization of output data selected at said MUX and forwarded to said processor when said first means for comparing does not yield an EA match.

33. The set associative cache of claim 31, further comprising:
logic for preventing utilization of output data selected at said MUX and forwarded to said processor when said second means for comparing does not yield an RA match.

34. The set associative cache of claim 31, wherein further said early selection is completed prior to completion of said comparison by said first means for comparing and said second means for comparing.

35. The set associative cache of claim 34, further comprising:
EA directory logic that dynamically updates thread valid bits in the EA directory when said monitoring indicates both an EA match and an RA match, wherein the thread valid bit for the thread requesting the data is set and the other thread valid bits within the EA directory are unchanged.

36. The set associative cache of claim 28, wherein said data processing system includes a memory and responsive to a cache miss, said cache further comprising:
means for initiating a cache miss response protocol to load requested data from an alternate storage location into one way of said cache;
means for selecting a way for loading said data loaded from said memory, wherein said way is selected based on a thread to which said data belongs and a current state of thread allocation within ways of said cache; and
logic for updating thread valid bits within the EA Directory.

* * * * *